United States Patent
Cakulev et al.

(10) Patent No.: US 11,758,593 B2
(45) Date of Patent: Sep. 12, 2023

(54) METHOD AND SYSTEM FOR POLICY AND SUBSCRIPTION INFLUENCED ALWAYS-ON PDU SESSIONS

(71) Applicant: Verizon Patent and Licensing Inc., Basking Ridge, NJ (US)

(72) Inventors: Violeta Cakulev, Millburn, NJ (US); Lalit R. Kotecha, San Ramon, CA (US); Sudhakar Reddy Patil, Flower Mound, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 86 days.

(21) Appl. No.: 17/013,948

(22) Filed: Sep. 8, 2020

(65) Prior Publication Data

US 2022/0078862 A1    Mar. 10, 2022

(51) Int. Cl.
| | |
|---|---|
| *H04W 76/00* | (2018.01) |
| *H04W 76/12* | (2018.01) |
| *H04W 76/11* | (2018.01) |
| *H04W 48/02* | (2009.01) |
| *H04W 48/18* | (2009.01) |
| *H04W 8/18* | (2009.01) |
| *H04W 80/10* | (2009.01) |

(52) U.S. Cl.
CPC ............ *H04W 76/12* (2018.02); *H04W 8/18* (2013.01); *H04W 48/02* (2013.01); *H04W 48/18* (2013.01); *H04W 76/11* (2018.02); *H04W 80/10* (2013.01)

(58) Field of Classification Search
None
See application file for complete search history.

(56) References Cited

U.S. PATENT DOCUMENTS

| | | | | |
|---|---|---|---|---|
| 11,528,770 | B2* | 12/2022 | Shu | H04W 76/25 |
| 2004/0266450 | A1* | 12/2004 | Chowdhury | H04W 76/25 |
| | | | | 455/452.2 |
| 2005/0041617 | A1* | 2/2005 | Huotari | H04L 47/824 |
| | | | | 370/395.2 |
| 2019/0174449 | A1* | 6/2019 | Shan | H04W 60/00 |
| 2020/0214054 | A1* | 7/2020 | Qiao | H04W 48/18 |
| 2020/0228936 | A1* | 7/2020 | Talebi Fard | H04W 8/186 |
| 2020/0275513 | A1* | 8/2020 | Park | H04W 76/22 |
| 2020/0351980 | A1* | 11/2020 | Talebi Fard | H04W 68/00 |
| 2021/0022099 | A1* | 1/2021 | Kumar | H04W 80/08 |
| 2022/0078871 | A1* | 3/2022 | Won | H04W 76/19 |

FOREIGN PATENT DOCUMENTS

EP      3419373 A1 *  12/2018  ......... H04L 12/1407

OTHER PUBLICATIONS

Sophia-Antipolis (France), Network control for always-on PDU sessions, Jul. 9-13, 2018,Huawei HiSilicon Samsung T-Mobile USA, 3GPP TSG-CT WG1 Meeting #111bis C1-184545; All (Year: 2018).*

* cited by examiner

*Primary Examiner* — Gerald A Smarth

(57) ABSTRACT

A method may include receiving, from a user device, a request to establish a packet data unit (PDU) session; determining that the PDU session should be established as an always-on PDU session; determining whether subscription data associated with the user device indicates that the user device is allowed to establish the always-on PDU session; and establishing the PDU session as an always-on PDU session in response to determining that the subscription data indicates that the user device is allowed to establish the always-on PDU session.

20 Claims, 5 Drawing Sheets

METHOD AND SYSTEM FOR POLICY AND SUBSCRIPTION INFLUENCED ALWAYS-ON PDU SESSIONS

BACKGROUND INFORMATION

In order to support low-latency communications, always-on packet data unit (PDU) sessions are defined for Fifth Generation (5G) systems. When a user device requests that a PDU session be established as an always-on PDU session, a communications network determines whether the PDU session is established as an always-on PDU session. Currently, the decision as to whether the PDU session is established as an always-on PDU session is not influenced by a subscription associated with the user device or by a policy and charging control function.

DETAILED DESCRIPTION OF PREFERRED EMBODIMENTS

The following detailed description refers to the accompanying drawings. The same reference numbers in different drawings identify the same or similar elements.

An always-on PDU session is a session in which user plane resources are activated for a user device during every transition from idle mode to connected mode. Always-on PDU sessions may be established for user devices requiring ultra low latency communications. For an always-on PDU session, the user plane may be activated even when no data is being transmitted. In this way, when a user device is ready to transmit data, the user plane resources are already activated and the data can be transmitted immediately, with minimal delays and low latency.

Currently, when a user device requests that a PDU session with a communications network be established as an always-on PDU session, the communications network may determine whether the PDU session is established as an always-on PDU session. For example, a user device may request a new PDU session to be established as an always-on PDU session by including an "always-on PDU session requested" information element (IE) in a PDU session establishment request message. The network may determine whether the requested PDU session is to be established as an always-on PDU session based on local policies or configurations. As another example, the network may determine that an always-on PDU session should be granted even when the always-on PDU session was not requested by the user device. The network may indicate to the user device whether the always-on PDU session has been established by including an "always-on PDU session granted" IE in a PDU session establishment accept message sent to the user device.

Currently, the decision of whether to grant an always-on PDU session is based on limited information, such as configurations or local policies. In addition, since an always-on PDU session requires that the user plane resources will be set up every time a user device transitions from idle mode to connected mode, setting up an always-on PDU session may be costly.

In order to base decisions of whether to grant always-on PDU sessions on additional information and in order to offset the cost of establishing an always-on PDU session, implementations described herein may provide enhancements to the 5G system so that a decision on whether a PDU session should be always-on may be influenced by a subscription and/or policy and charging control mechanisms. In one implementation, the decision to enable an always-on PDU session may be influenced by a subscription associated with a user device that indicates that the user device is allowed to establish an always-on PDU session. In another implementation, the decision to enable an always-on PDU session may be influenced by a Policy and Charging Control Function indicating whether an always-on PDU session is authorized for the user device.

Figure 1:
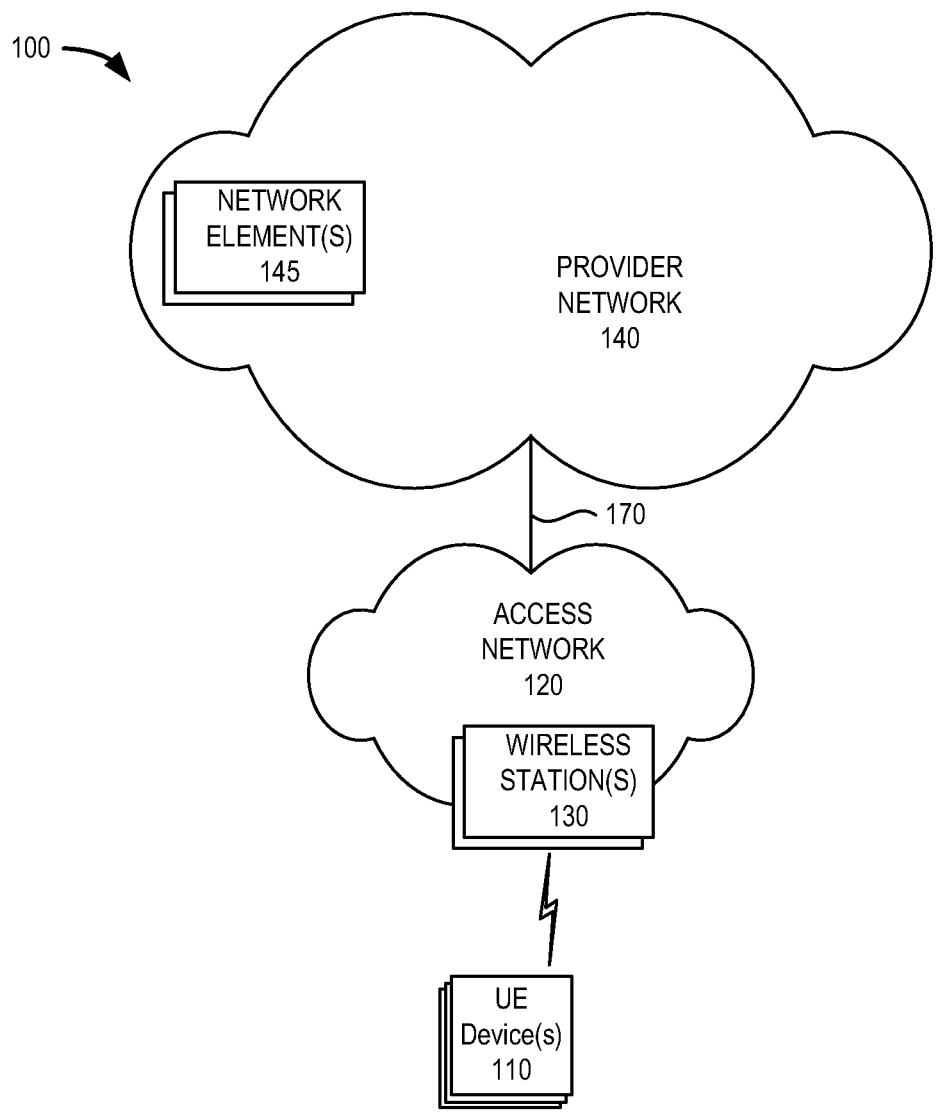
FIG. 1 is a diagram illustrating a network environment according to an implementation described herein.

FIG. 1 is a diagram illustrating concepts described herein. As shown in FIG. 1, an environment 100 may include one or more user equipment (UE) devices 110 (referred to herein collectively as UEs 110 or individually as UE 110), an access network 120, one or more wireless stations 130, and a provider network 140.

UE 110 may include a wireless Machine-Type-Communication (MTC) device that communicates wirelessly with other devices over a machine-to-machine (M2M) interface; a handheld wireless communication device; a wearable computer device (e.g., a head-mounted display computer device, a head-mounted camera device, a wristwatch computer device, etc.); a global positioning system (GPS) device; a media playing device; a portable gaming system; a laptop, tablet, or another type of portable computer; a smartphone; and/or any other type of computer device with wireless communication capabilities. UE 110 may be used for voice communication, mobile broadband services (e.g., video streaming, real-time gaming, premium Internet access etc.), best-effort data traffic, and/or other types of applications.

Access network 120 may provide access to provider network 140 for wireless devices, such as UEs 110. Access network 120 may enable UE 110 to connect to provider network 140 for Internet access, non-Internet Protocol (IP) data delivery, cloud computing, mobile telephone service, Short Message Service (SMS) message service, Multimedia Message Service (MMS) message service, and/or other types of data services. Access network 120 may include wireless stations 130, and UE 110 may wirelessly communicate with access network 120 via wireless station 130. Access network 120 may establish a packet data network connection between UE 110 and provider network 140 via one or more Access Point Names (APNs). For example, access network 120 may establish an Internet Protocol (IP) connection between UE 110 and provider network 140. In another implementation, access network 120 may provide access to a service or application layer network, a cloud network, a multi-access edge computing (MEC) network, a fog network, and so forth. Furthermore, access network 120 may enable a server device to exchange data with UE 110 using a non-IP data delivery method such as Data over Non-Access Stratum (DoNAS).

Access network 120 may include a 5G access network or another advanced network, such as a Fourth Generation (4G) LTE network. Additionally, access network 120 may include functionality such as a mm-wave Radio Access Network (RAN); advanced or massive multiple-input and multiple-output (MIMO) configurations (e.g., an 8×8 antenna configuration, a 16×16 antenna configuration, a 256×256 antenna configuration, etc.); cooperative MIMO (CO-MIMO); carrier aggregation; relay stations; Heterogeneous Networks (HetNets) of overlapping small cells and macrocells; Self-Organizing Network (SON) functionality; MTC functionality, such as 1.4 MHz wide enhanced MTC (eMTC) channels (also referred to as category Cat-M1), Low Power Wide Area (LPWA) technology such as Narrow Band (NB) IoT (NB-IoT) technology, and/or other types of MTC technology; and/or other types of 5G functionality.

Wireless station 130 may include a gNodeB base station device and/or an eNodeB base station device that includes one or more devices (e.g., wireless transceivers) and other components and functionality that allow UE 110 to wirelessly connect to access network 120. Wireless station 130 may correspond to a macrocell or to a small cell (e.g., a femtocell, a picocell, a microcell, etc.). In other implementations, wireless station 130 may include another type of base station for another type of wireless network. Wireless stations 130 may connect to provider network 140 via backhaul links 170.

Provider network 140 may include a local area network (LAN), a wide area network (WAN), a metropolitan area network (MAN), an optical network, a cable television network, a satellite network, a wireless network (e.g., a code-division multiple access (CDMA) network, a general packet radio service (GPRS) network, a 5G Core network, and/or a long-term evolution (LTE) network), an ad hoc network, a telephone network (e.g., the Public Switched Telephone Network (PSTN) or a cellular network), an intranet, or a combination of networks. In one implementation, provider network 140 may allow the delivery of Internet Protocol (IP) services to UE 110, and may interface with other external networks, such as private IP networks.

According to one implementation, provider network 140 may include a core network for one or multiple access networks 120. For example, provider network 140 may include the core part of a 5G New Radio network, etc. Depending on the implementation, provider network 140 may include various network elements 145, such as a gateway, a support node, a serving node, a router, a switch, a bridge, as well as other network elements pertaining to various network-related functions, such as billing, security, authentication and authorization, network polices, subscriber profiles, etc. In some implementations, provider network 140 may include an Internet Protocol Multimedia Sub-system (IMS) network (not shown in FIG. 1). An IMS network may include a network for delivering IP multimedia services and may provide media flows between UE 110 and external IP networks (not shown in FIG. 1).

Although FIG. 1 shows exemplary components of environment 100, in other implementations, environment 100 may include fewer components, different components, differently arranged components, or additional functional components than depicted in FIG. 1. For example, in one implementation, environment 100 may include a MEC network that provides applications and services at the edge of a network, such as provider network 140. Additionally or alternatively, one or more components of environment 100 may perform functions described as being performed by one or more other components of environment 100.

Figure 2:
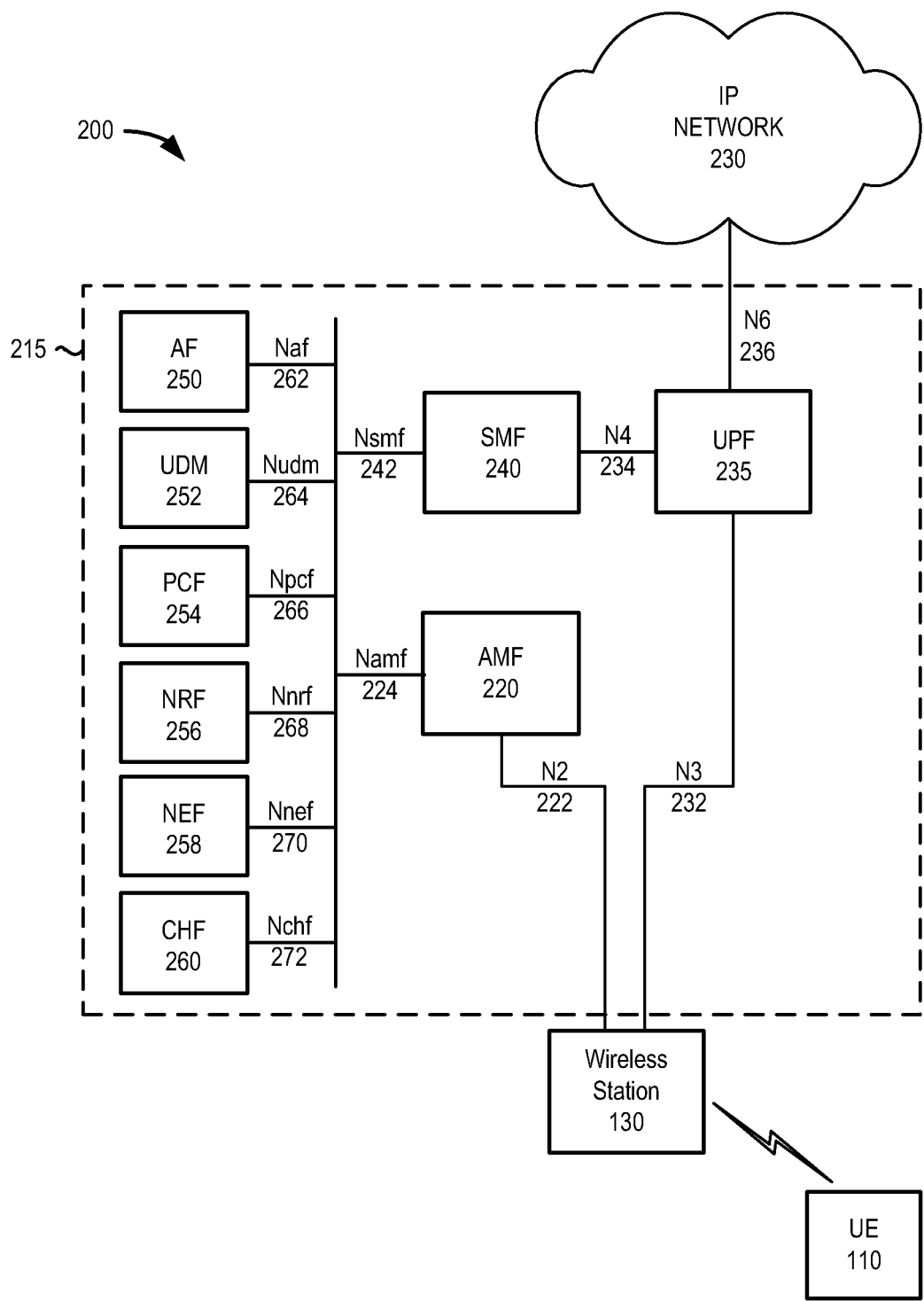
FIG. 2 is a diagram illustrating connections among devices in an exemplary portion of the network environment of FIG. 1.

FIG. 2 is a diagram illustrating a network environment 200 that includes exemplary components of environment 100 according to an implementation described herein. As shown in FIG. 2, network environment 200 may include UE 110, wireless station 130, a core network 215, and an IP network 230. Core network 215 and IP network 230 may correspond to, or be included in, provider network 140.

Core network 215 may include an Access and Mobility Management Function (AMF) 220, a User Plane Function (UPF) 235, a Session Management Function (SMF) 240, an Application Function (AF) 250, a Unified Data Management (UDM) 252, a Policy Control Function (PCF) 254, a Network Repository Function (NRF) 256, a Network Exposure Function (NEF) 258, and a Charging Function (CHF) 260. AMF 220, UPF 235, SMF 240, AF 250, UDM 252, PCF 254, NRF 256, NEF 258, and CHF 260 may correspond to network elements 145 of FIG. 1 and may each be implemented as separate network devices or as nodes shared among one or more network devices. While FIG. 2 depicts a single AMF 220, UPF 235, SMF 240, AF 250, UDM 252, PCF 254, NRF 256, NEF 258, and CHF 260 for illustration purposes, in practice, FIG. 2 may include multiple wireless stations 130, AMFs 220, UPFs 235, SMFs 240, AFs 250, UDMs 252, PCFs 254, NRFs 256, NEFs 258, and/or CHFs 260.

Wireless station 130 may include one or more devices and other components and functionality that enable UE 110 to wirelessly connect to access network 120 using 5G Radio Access Technology (RAT). Wireless station 130 may include, for example, a gNodeB (gNB) with a wireless transceiver with an antenna array configured for mm-wave wireless communication. In other implementation, wireless station 130 may include another type of base station. Wireless station 130 may communicate with AMF 220 using an N2 interface 222 and communicate with UPF 235 using an N3 interface 232.

AMF 220 may perform registration management, connection management, reachability management, mobility management, lawful intercepts, Short Message Service (SMS) transport between UE 110 and an SMS function (not shown in FIG. 2), session management messages transport between UE 110 and SMF 240, access authentication and authorization, location services management, functionality to support non-3GPP access networks, and/or other types of management processes. AMF 220 may be accessible by other function nodes via a Namf interface 224.

UPF 235 may maintain an anchor point for intra/inter-RAT mobility, maintain an external Packet Data Unit (PDU) point of interconnect to a data network (e.g., IP network 230, etc.), perform packet routing and forwarding, perform the user plane part of policy rule enforcement, perform packet inspection, perform lawful intercept, perform traffic usage reporting, perform quality of service (QoS) handling in the user plane, perform uplink traffic verification, perform transport level packet marking, perform downlink packet buffering, send and forward an "end marker" to a Radio Access Network (RAN) node (e.g., wireless station 130), and/or perform other types of user plane processes. UPF 235 may communicate with SMF 240 using an N4 interface 234 and connect to IP network 230 using an N6 interface 236.

SMF 240 may perform session establishment, modification, and/or release, perform IP address allocation and management, perform Dynamic Host Configuration Protocol (DHCP) functions, perform selection and control of UPF 235, configure traffic steering at UPF 235 to guide traffic to the correct destination, terminate interfaces toward PCF 254, perform lawful intercepts, charge data collection, support charging interfaces, control and coordinate charging data collection, termination of session management parts of Non-Access Stratum (NAS) messages, perform downlink data notification, manage roaming functionality, and/or perform other types of control plane processes for managing user plane data. According to implementations described herein, SMF 240 may determine whether a PDU session associated with UE 110 should be established as an always-on PDU session. SMF 240 may be accessible via an Nsmf interface 242.

AF 250 may provide services associated with a particular application, such as, for example, application influence on traffic routing, accessing NEF 258, interacting with a policy framework for policy control, and/or other types of applications. AF 250 may be accessible via an Naf interface 262.

UDM 252 may maintain subscription information for UEs 110, manage subscriptions, generate authentication credentials, handle user identification, perform access authorization based on subscription data, perform network function registration management, maintain service and/or session continuity by maintaining assignment of SMF 240 for ongoing sessions, support SMS delivery, support lawful intercept functionality, and/or perform other processes associated with managing user data. According to an implementation described herein, UDM 252 may maintain subscription information for UE 110 that indicates whether UE 110 is allowed to establish always-on PDU sessions. UDM 252 may be accessible via a Nudm interface 264.

PCF 254 may support policies to control network behavior, provide policy rules to control plane functions (e.g., to SMF 240), access subscription information relevant to policy decisions, perform policy decisions, and/or perform other types of processes associated with policy enforcement. According to an implementation described herein, PCF 254 may determine whether an always-on PDU session is authorized for UE 110. PCF 254 may be accessible via Npcf interface 266.

NRF 256 may support a service discovery function and maintain a profile of available network function (NF) instances and their supported services. An NF profile may include an NF instance identifier (ID), an NF type, a Public Land Mobile Network identifier (PLMN-ID) associated with the NF, a network slice ID associated with the NF, capacity information for the NF, service authorization information for the NF, supported services associated with the NF, endpoint information for each supported service associated with the NF, and/or other types of NF information. NRF 256 may be accessible via an Nnrf interface 268.

NEF 258 may expose capabilities and events to other NFs, including third-party NFs, AFs, edge computing NFs, and/or other types of NFs. Furthermore, NEF 258 may secure provisioning of information from external applications to access network 120, translate information between access network 120 and devices/networks external to access network 120, support a Packet Flow Description (PFD) function, and/or perform other types of network exposure functions. NEF 258 may be accessible via Nnef interface 270.

CHF 260 may provide an interface to a converged charging system (CCS). CHF 260 may include the interface between the CCS and the provider network 140. CHF 260 may provide spending limits and quotas for services to SMF 240 and may collect usage information from SMF 240 for online and offline services. CHF 260 may be accessible via Nchf interface 272.

IP network 230 may include a communication network that uses IP to send and receive messages between one or more devices. IP network 230 may be accessible via N6 interface 236.

Although FIG. 2 shows exemplary components of core network 215, in other implementations, core network 215 may include fewer components, different components, differently arranged components, or additional components than depicted in FIG. 2. Additionally or alternatively, one or more components of core network 215 may perform functions described as being performed by one or more other components of core network 215. For example, core network 215 may include additional function nodes not shown in FIG. 2, such as an Authentication Server Function (AUSF), a Non-3GPP Interworking Function (N3IWF), a Unified Data Repository (UDR), an Unstructured Data Storage Network Function (UDSF), a 5G Equipment Identity Register (5G-EIR) function, a Location Management Function (LMF), a Security Edge Protection Proxy (SEPP) function, a Network Slice Selection Function (NSSF) and/or other types of functions. Furthermore, while particular interfaces have been described with respect to particular function nodes in FIG. 2, additionally or alternatively, core network 215 may include a reference point architecture that includes point-to-point interfaces between particular function nodes.

Figure 3:
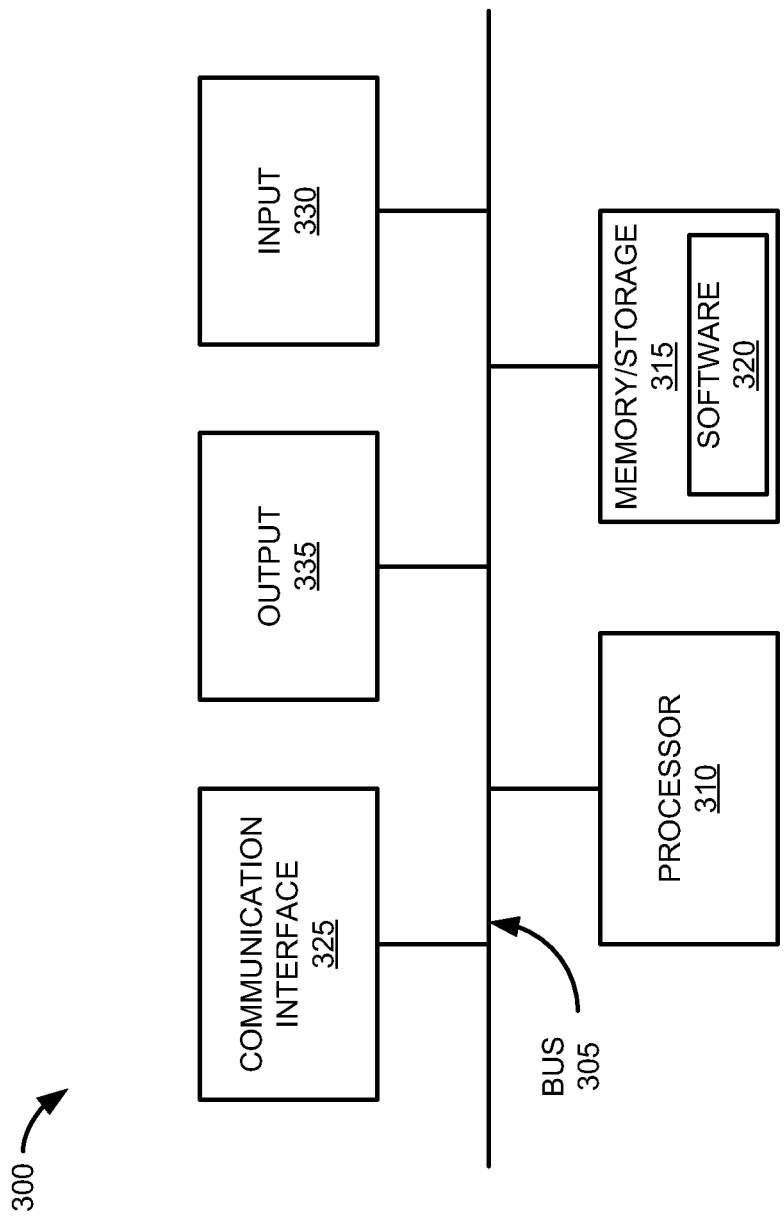
FIG. 3 is a diagram of exemplary components that may be included in one or more of the devices shown in FIGS. 1 and 2.

FIG. 3 is a diagram illustrating exemplary components of a device 300 that may correspond to one or more of the devices described herein. For example, device 300 may correspond to components included in UE 110, wireless station 130, network elements 145, AMF 220, UPF 235, SMF 240, AF 250, UDM 252, PCF 254, NRF 256, NEF 258, CHF 260, and/or other components of access network 120 and/or provider network 140. As illustrated in FIG. 3, according to an exemplary embodiment, device 300 includes a bus 305, a processor 310, a memory/storage 315 that stores software 320, a communication interface 325, an input 330, and an output 335. According to other embodiments, device 300 may include fewer components, additional components, different components, and/or a different arrangement of components than those illustrated in FIG. 3 and described herein.

Bus 305 includes a path that permits communication among the components of device 300. For example, bus 305 may include a system bus, an address bus, a data bus, and/or a control bus. Bus 305 may also include bus drivers, bus arbiters, bus interfaces, and/or clocks.

Processor 310 includes one or multiple processors, microprocessors, data processors, co-processors, application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, and/or some other type of component that interprets and/or executes instructions and/or data. Processor 310 may be implemented as hardware (e.g., a microprocessor, etc.), a combination of hardware and software (e.g., a SoC, an ASIC, etc.), may include one or multiple memories (e.g., cache, etc.), etc. Processor 310 may be a dedicated component or a non-dedicated component (e.g., a shared resource).

Processor 310 may control the overall operation or a portion of operation(s) performed by device 300. Processor 310 may perform one or multiple operations based on an operating system and/or various applications or computer programs (e.g., software 320). Processor 310 may access instructions from memory/storage 315, from other components of device 300, and/or from a source external to device 300 (e.g., a network, another device, etc.). Processor 310 may perform an operation and/or a process based on various techniques including, for example, multithreading, parallel processing, pipelining, interleaving, etc.

Memory/storage 315 includes one or multiple memories and/or one or multiple other types of storage mediums. For example, memory/storage 315 may include one or multiple types of memories, such as, random access memory (RAM), dynamic random access memory (DRAM), cache, read only memory (ROM), a programmable read only memory (PROM), a static random access memory (SRAM), a single in-line memory module (SIMM), a dual in-line memory module (DIMM), a flash memory (e.g., a NAND flash, a NOR flash, etc.), and/or some other type of memory. Memory/storage 315 may include a hard disk (e.g., a magnetic disk, an optical disk, a magneto-optic disk, a solid state disk, etc.), a Micro-Electromechanical System (MEMS)-based storage medium, and/or a nanotechnology-based storage medium. Memory/storage 315 may include a drive for reading from and writing to the storage medium.

Memory/storage 315 may be external to and/or removable from device 300, such as, for example, a Universal Serial Bus (USB) memory stick, a dongle, a hard disk, mass storage, off-line storage, network attached storage, or some other type of storing medium (e.g., a compact disk (CD), a digital versatile disk (DVD), a Blu-Ray disk (BD), etc.). Memory/storage 315 may store data, software, and/or instructions related to the operation of device 300.

Software 320 includes an application or a program that provides a function and/or a process. Software 320 may include an operating system. Software 320 is also intended to include firmware, middleware, microcode, hardware description language (HDL), and/or other forms of instruction. Additionally, for example, a 5G UE 110 may include logic to perform tasks, as described herein, based on software 320.

Communication interface 325 permits device 300 to communicate with other devices, networks, systems, devices, and/or the like. Communication interface 325 includes one or multiple radio frequency (RF) wireless interfaces and/or wired interfaces. For example, communication interface 325 may include one or multiple transmitters and receivers, or transceivers. Communication interface 325 may include one or more antennas. For example, communication interface 325 may include an array of antennas. Communication interface 325 may operate according to a protocol stack and a communication standard. Communication interface 325 may include various processing logic or circuitry (e.g., multiplexing/de-multiplexing, filtering, amplifying, converting, error correction, etc.).

Input 330 permits an input into device 300. For example, input 330 may include a keyboard, a mouse, a display, a button, a switch, an input port, speech recognition logic, a biometric mechanism, a microphone, a visual and/or audio capturing device (e.g., a camera, etc.), and/or some other type of visual, auditory, tactile, etc., input component. Output 335 permits an output from device 300. For example, output 335 may include a speaker, a display, a light, an output port, and/or some other type of visual, auditory, tactile, etc., output component. According to some embodiments, input 330 and/or output 335 may be a device that is attachable to and removable from device 300.

Device 300 may perform a process and/or a function, as described herein, in response to processor 310 executing software 320 stored by memory/storage 315. By way of example, instructions may be read into memory/storage 315 from another memory/storage 315 (not shown) or read from another device (not shown) via communication interface 325. The instructions stored by memory/storage 315 cause processor 310 to perform a process described herein. Alternatively, for example, according to other implementations, device 300 performs a process described herein based on the execution of hardware (processor 310, etc.).

Figure 4:
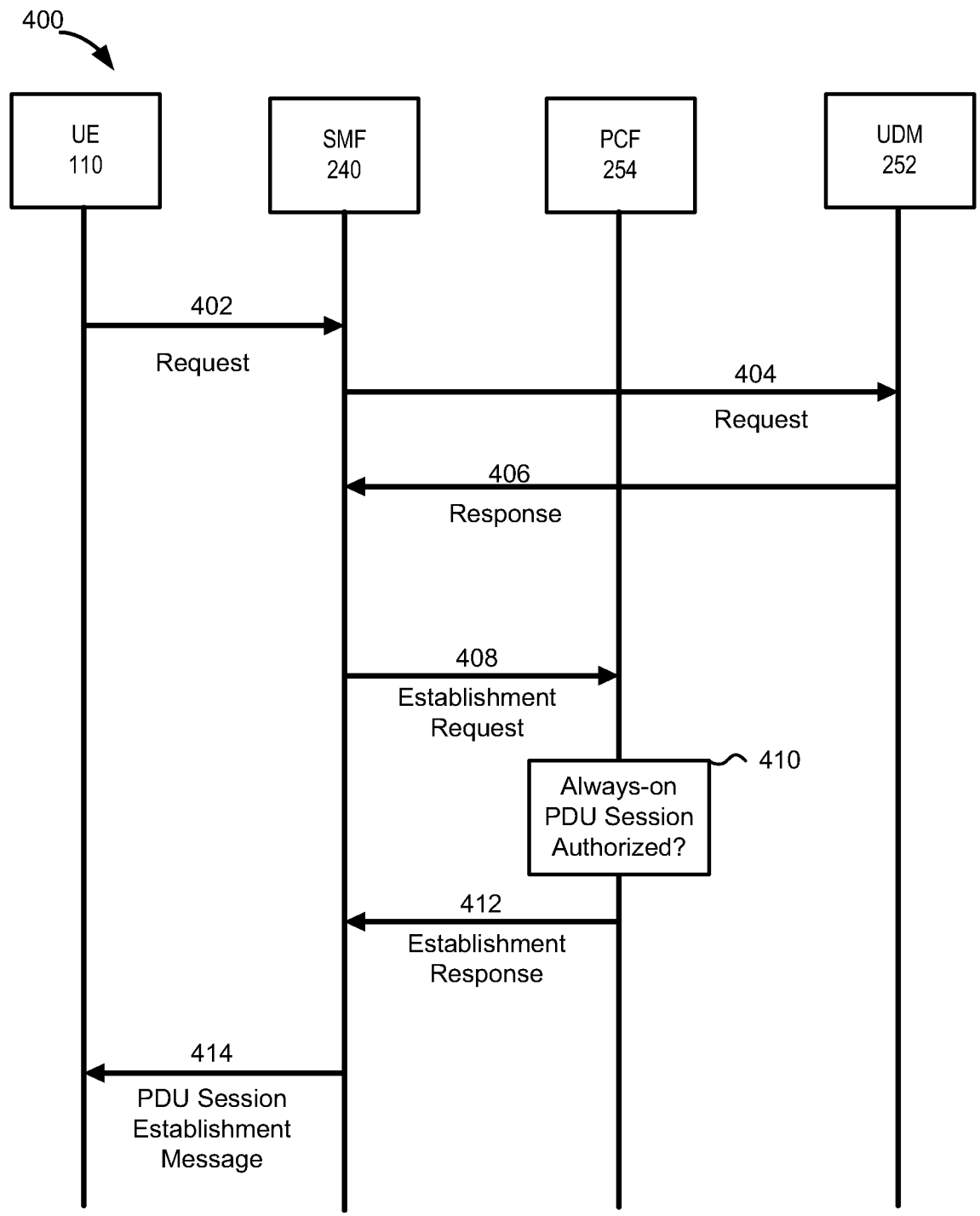
FIG. 4 is a signal flow diagram illustrating exemplary communications for determining whether to establish an always-on PDU session.

FIG. 4 is a diagram illustrating exemplary communications for determining whether to establish an always-on PDU session for UE 110. Network portion 400 may include UE 110, SMF 240, PCF 254, and UDM 252. Communications shown in FIG. 4 provide simplified illustrations of communications in network portion 400 and are not intended to reflect every signal or communication exchanged between devices. Furthermore, additional information not described herein may be communicated with some signals or communications. Additional devices not shown in FIG. 4 may receive and/or transmit some signals or communications not described herein.

As shown in FIG. 4, UE 110 may transmit a request 402 for a PDU session. For example, UE 110 may send a PDU session establishment request to SMF 240. In one implementation, the PDU session establishment request may include a request for the PDU session to be an always-on PDU session. For example, request 402 may include an always-on PDU session requested IE. In another implementation, request 402 may not include a request for the PDU session to be an always-on PDU session.

SMF 240 may receive request 402 from UE 110 and may send a request 404 to UDM 252 to determine whether UE 110 is allowed to establish an always-on PDU session. In one implementation, SMF 240 may send request 404 to UDM 252 when request 402 includes a request for the PDU session to be an always-on PDU session. In another implementation, SMF 240 may send request 404 to UDM 252 that does not include a request for the session to be an always-on PDU session, but SMF 240 determines that the PDU session should be established as always-on. For example, SMF 240 may receive a PDU session establishment request 402 from UE 110 and may determine based on local policies that the session should be established as always-on.

In one implementation, request 404 may include a subscription retrieval request. For example, UDM 252 may store Session Management Subscription data associated with UE 110 or a user associated with UE 110 and SMF 240 may send a subscription retrieval request to UDM 252 to determine whether a subscription associated with UE 110 or the user associated with UE 110 indicates that always-on PDU sessions are allowed for UE 110. In one implementation, when the user has subscribed to a service associated with provider network 140 that allows always-on PDU sessions, Session Management Subscription data associated with UE 110 or the user associated with UE 110 may store an "always-on PDU session allowed" indication. In another implementation, when the user has subscribed to a service that does not allow always-on PDU sessions, Session Management Subscription data associated with UE 110 or the user associated at UE 110 may store an indication that always-on PDU sessions are not allowed. In another implementation, the Session Management Subscription data may not indicate whether UE 110 is allowed to establish an always-on PDU session.

SMF 240 may receive a response 406 from UDM 252. In one implementation, response 406 may indicate that that always-on PDU sessions are allowed for UE 110 or that the Session Management Subscription data does not indicate whether UE 110 is allowed to establish an always-on PDU session. For example, an account associated with UE 110 or a user associated with UE 110 may indicate that the user has subscribed to a service that allows always-on PDU sessions. As another example, the account associated with UE 110 or the user associated with UE 110 may not indicate whether the user has subscribed to a service that allows always-on PDU sessions.

In one implementation, when request 402 includes a request for the PDU session to be an always-on PDU session and response 406 indicates that always-on PDU sessions are allowed for UE 110 or that the Session Management Subscription data does not indicate whether UE 110 is allowed to establish an always-on PDU session, SMF 240 may determine whether to grant the always-on PDU session based on local policies. In another implementation not shown in FIG. 4, when request 402 includes a request for the PDU session to be an always-on PDU session and response 406 indicates that always-on PDU sessions are not allowed for UE 110, SMF 240 will not grant the request for the always-on PDU session.

In another implementation, when request 402 does not include a request for the PDU session to be an always-on PDU session and response 406 indicates that always-on PDU sessions are allowed for UE 110 or that the Session Management Subscription data does not indicate whether UE 110 is allowed to establish an always-on PDU session, SMF 240 may transmit a message to UE 110 that includes an "always-on PDU session granted" IE. In another implementation not shown in FIG. 4, when request 402 does not include a request for the PDU session to be an always-on PDU session and response 406 indicates that UE 110 is not authorized to establish an always-on PDU session, SMF 240 will not include an "always-on PDU session granted" IE in a message transmitted to UE 110.

Continuing with FIG. 4, SMF 240 may send PCF 254 an establishment request 408 including a request for an always-on PDU session. For example, when response 406 indicates that always-on PDU sessions are allowed for UE 110 or that the Session Management Subscription data does not indicate whether UE 110 is allowed to establish an always-on PDU session, SMF 240 may send PCF 254 establishment request 408 that includes an "always-on PDU session requested" IE. In one implementation, establishment request 408 may include a SMPolicyAssociation Establishment request. PCF 254 may receive establishment request 408 and, in step 410, may determine whether the request for the always-on PDU session is authorized. For example, PCF 254 may determine whether the request for an always-on PDU session is authorized for UE 110 based on operator policies.

After determining whether the request for the always-on PDU session is authorized, PCF 254 may send an establishment response 412 to SMF 240. Establishment response 412 may include a SMPolicyAssociation Establishment response. In one implementation, if PCF 254 determines that the request for the always-on PDU session is authorized, establishment response 412 may include an "always-on PDU session authorized" IE. In another implementation, if PCF 254 determines that the request for the always-on PDU session is not authorized, establishment response 412 may include an "always-on PDU session not authorized" IE.

After receiving establishment response 412 from PCF 254, SMF 240 may send a PDU session establishment message 414 to UE 110. SMF 240 may send session establishment message 414 to UE 110 via other elements, such as AMF 220. In one implementation, if establishment response 412 indicates that the always-on PDU session is authorized, PCF 254 may grant an always-on PDU session and PDU session establishment message 414 may include an "always-on PDU session granted" IE granting the always-on PDU session. In another implementation, if UE 110 had requested the always-on PDU session and establishment response 412 indicates that the always-on PDU session is not authorized, SMF 240 will not grant the request for the always-on PDU session. In this implementation, PDU session establishment message 414 may include an indication that the always-on PDU session has not been granted or PDU session establishment message 414 may not include an "always-on PDU session granted" IE. In another implementation, if UE 110 did not request the always-on PDU session and establishment response 412 indicates that the always-on PDU session is not authorized, SMF 240 may not include an "always-on PDU session granted" IE in PDU session establishment message 414.

Figure 5:
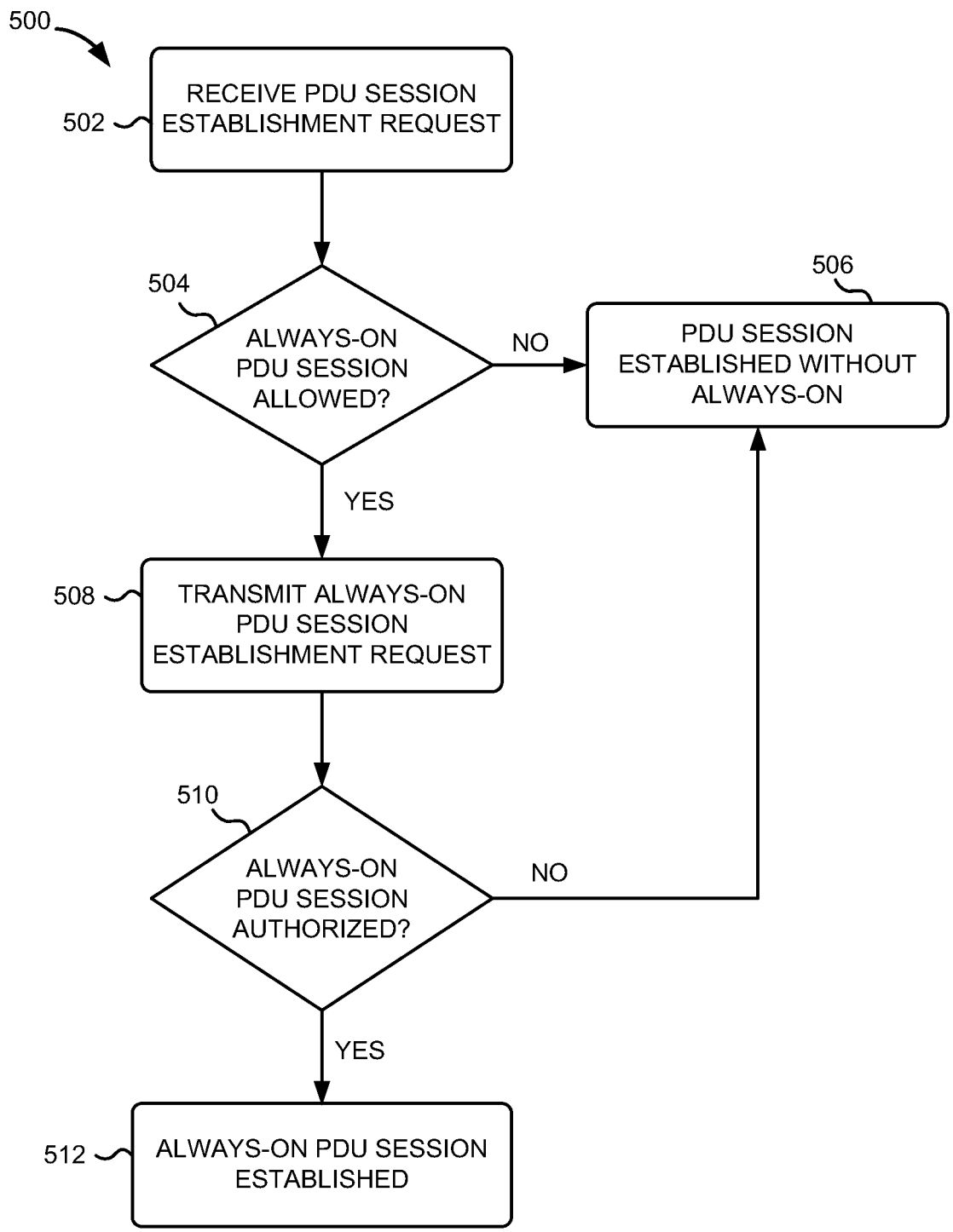
FIG. 5 is a flow diagram illustrating an exemplary process for determining whether to establish an always-on PDU session, according to an implementation described herein.

FIG. 5 is a flow diagram illustrating an exemplary process 500 for determining whether UE 110 is authorized to establish an always-on PDU session. In one implementation, the steps of process 500 may be performed by UE 110, SMF 240, PCF 254, and/or UDM 252. However, in other implementations, process 500 may be performed by other elements of environment 100 and/or 200.

Process 500 may begin by receiving a PDU session establishment request from UE 110 (block 502). For example, SMF 240 may receive a PDU session request from UE 110. In one implementation, the PDU session establishment request may include a request to establish an always-on PDU session. For example, the PDU session request may include an "always-on PDU session requested" IE. In another implementation, the PDU session request may not include a request to establish an always-on PDU session, but SMF 240 may determine based on local policies, that the PDU session should be established as always-on.

SMF 240 may determine whether UE 110 is allowed to establish an always-on PDU session (block 504). SMF 240 may determine whether UE 110 is allowed to establish an always-on PDU session by accessing UDM 252 to determine whether a profile associated with UE 110 indicates that a user associated with UE 110 has subscribed to a service that allows always-on PDU sessions. For example, SMF 240 may check Session Management Subscription data stored at UDM 252 to determine whether a subscription associated with UE 110 indicates that UE 110 is allowed to establish an always-on session.

In one implementation, SMF 240 may determine that UE 110 is not allowed to establish an always-on PDU session when the Session Management Subscription data indicates that UE 110 is not allowed to establish an always-on PDU session. In another implementation, SMF 240 may determine that UE 110 is allowed to establish an always-on PDU session when the subscription data indicates that an always-on PDU session is allowed for UE 110. In another implementation, SMF 240 may determine that UE 110 is allowed to establish an always-on PDU session when the "always-on PDU session allowed" indication and the "always-on PDU session not allowed" indication are not present in the subscription data.

If UE 110 is not allowed to establish an always-on PDU session (block 504—no), a PDU session associated with UE 110 may not be established as always-on (block 506). In one implementation, if UE 110 has requested the always-on PDU session and the subscription data indicates that UE 110 is not allowed to establish an always-on PDU session, SMF 240 may not grant the always-on PDU session and SMF 240 may send UE 110 an indication that the always-on PDU session has not been granted.

IF UE 110 is allowed to establish an always-on PDU session (block 504—yes), SMF 240 may transmit an always-on PDU session establishment request to PCF 254 (block 508). In one implementation, when UE 110 is allowed to establish an always-on PDU session, SMF 240 may include an "always-on PDU session requested" IE in an SMPolicyAssociation Establishment request sent to PCF 254.

SMF 240 may receive an establishment response from PCF 254 that indicates whether the requested always-on PDU session is authorized (block 510). In one implementation, PCF 254 may determine whether the always-on PDU session request is authorized based on operator policies. If the request for an always-on PDU session is authorized for UE 110, PCF 254 may include an "always-on PDU session authorized" IE in an SMPolicyAssociation Establishment response sent to SMF 240. If the always-on PDU session is not authorized for UE 110 (block 510—no), PCF 254 may include an "always-on PDU session not authorized" IE in the SMPolicyAssociation Establishment response sent to SMF 240.

If the always-on PDU session is authorized (block 510—yes), the always-on PDU session may be established for UE 110 (block 512). In one implementation, SMF 240 may grant the always-on PDU session and may send a message to UE 110 indicating that a PDU session has been established. The message may include an "always-on PDU session granted" IE to indicate that the "always-on PDU session" has been granted.

If the always-on PDU session is not authorized (block 510—no), the PDU session may not be established as always-on (block 506). In one implementation, if UE 110 requested the always-on PDU session and PCF 254 has indicated that the always-on PDU session is not authorized, SMF 240 may not grant the always-on PDU session and SMF 240 may send UE 110 an indication that the always-on PDU session has not been granted. For example, SMF 240 may transmit a message to UE 110 indicating that a PDU session has been established and may indicate in the message that the always-on PDU session has not been granted. As another example, SMF 240 may send UE 110 a message indicating that the PDU session has been established and SMF 240 may not include an "always-on PDU session granted" IE in the message.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while series of blocks have been described with respect to FIG. 5, and series of signal flows have been described with respect to FIG. 4, the order of the blocks and/or signal flows may be modified in other implementations. Further, non-dependent blocks may be performed in parallel.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an ASIC, or a FPGA, or a combination of hardware and software (e.g., a processor executing software).

It should be emphasized that the terms "comprises"/ "comprising" when used in this specification are taken to specify the presence of stated features, integers, steps or components but does not preclude the presence or addition of one or more other features, integers, steps, components or groups thereof.

The term "logic," as used herein, may refer to a combination of one or more processors configured to execute instructions stored in one or more memory devices, may refer to hardwired circuitry, and/or may refer to a combination thereof. Furthermore, a logic may be included in a single device or may be distributed across multiple, and possibly remote, devices.

For the purposes of describing and defining the present invention, it is additionally noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential to the embodiments unless explicitly described as such. Also, as used herein, the article "a" is intended to include one or more items. Further, the phrase "based on" is intended to mean "based, at least in part, on" unless explicitly stated otherwise.

What is claimed is:

1. A method comprising:
   receiving, from a user device, a request to establish a packet data unit (PDU) session;
   determining that the PDU session should be established as an always-on PDU session;
   determining whether a user associated with the user device has subscribed to a service associated with a provider network that indicates that the user device is allowed to establish the always-on PDU session; and
   establishing the PDU session as an always-on PDU session in response to determining that the user associated with the user device has subscribed to a service associated with the provider network that indicates that the user device is allowed to establish the always-on PDU session, wherein establishing the PDU session as an always-on PDU session further comprises:

transmitting an establishment request message to a Policy Control Function (PCF) node, determining, by the PCF node, whether the user device is authorized to establish the always-on PDU session based on policies associated with the provider network, and receiving, from the PCF node, an establishment response message indicating that the user device is authorized to establish the always-on PDU session.

2. The method of claim 1, wherein determining that the PDU session should be established as an always-on PDU session includes determining that the PDU session should be established as an always-on PDU session when the request includes a request to establish the PDU session as an always-on PDU session.

3. The method of claim 1, wherein determining whether the user associated with the user device has subscribed to a service associated with the provider network that indicates that the user device is allowed to establish the always-on PDU session includes sending a subscription retrieval request to a Unified Data Management (UDM) device to determine whether subscription data indicates that the user device is allowed to establish the always-on PDU session.

4. The method of claim 1, wherein establishing the PDU session as an always-on PDU session further comprises:

establishing the PDU session as an always-on PDU session based on receiving the establishment response message.

5. The method of claim 1, further comprising:

establishing the PDU session not as an always-on PDU session in response to determining that the user device is not allowed to establish the always-on PDU session.

6. The method of claim 1, wherein determining whether the user device is allowed to establish the always-on PDU session comprises:

determining that the user device is allowed to establish the always-on PDU session when subscription data includes a first indication that the always-on PDU session is allowed or when the subscription data does not include an indication regarding whether the always-on PDU session is allowed; and determining that the user device is not allowed to establish the always-on PDU session when the subscription data includes a second indication that the always-on PDU session is not allowed.

7. The method of claim 1, further comprising:

transmitting, to the user device, an indication that the always-on PDU session has been granted.

8. A network device comprising:

one or more processors configured to:

receive, from a user device, a request to establish a packet data unit (PDU) session;

determine that the PDU session should be established as an always-on PDU session;

determine whether a user associated with the user device has subscribed to a service associated with a provider network that indicates that the user device is allowed to establish the always-on PDU session; and establish the PDU session as an always-on PDU session in response to determining that the user associated with the user device has subscribed to a service associated with a provider network that indicate that the user device is allowed to establish the always-on PDU session, wherein when establishing the PDU session as an always-on PDU session, the one or more processors are configured to:

transmit an establishment request message to a Policy Control Function (PCF) node, determine, by the PCF node, whether the user device is authorized to establish the always-on PDU session based on policies associated with the provider network, and receive, from the PCF node, an establishment response message indicating that the user device is authorized to establish the always-on PDU session.

9. The network device of claim 8, wherein, when determining that the PDU session should be established as an always-on PDU session, the one or more processors are further configured to:

determine that the PDU session should be established as an always-on PDU session when the request includes a request to establish the PDU session as an always-on PDU session.

10. The network device of claim 8, wherein, when determining whether the user associated with the user device has subscribed to a service associated with the provider network that indicates that the user device is allowed to establish the always-on PDU session, the one or more processors are further configured to:

send a subscription retrieval request to a Unified Data Management (UDM) device to determine whether the subscription data indicates that the user device is allowed to establish the always-on PDU session.

11. The network device of claim 8, wherein, when establishing the PDU session as an always-on PDU session, the one or more processors are further configured to:

establish the PDU session as an always-on PDU session based on receiving the establishment response message.

12. The network device of claim 8, wherein the one or more processors are further configured to:

establish the PDU session not as an always-on PDU session in response to determining that the user device is not allowed to establish the always-on PDU session.

13. The network device of claim 8, wherein, when determining whether the user device is allowed to establish the always-on PDU session, the one or more processors are further configured to:

determine that the user device is allowed to establish the always-on PDU session when subscription data includes a first indication that the always-on PDU session is allowed or when the subscription data does not include an indication regarding whether the always-on PDU session is allowed; and determine that the user device is not allowed to establish the always-on PDU session when the subscription data includes a second indication that the always-on PDU session is not allowed.

14. The network device of claim 8, wherein the one or more processors are further configured to:

transmit, to the user device, an indication that the always-on PDU session has been granted.

15. A non-transitory computer-readable memory device storing instructions executable by a processor, the instructions comprising:
one or more instructions to:
receive, from a user device, a request to establish a packet data unit (PDU) session;
determine that the PDU session should be established as an always-on PDU session;
determine whether a user associated with the user device has subscribed to a service associated with a provider network that indicates that the user device indicates that the user device is allowed to establish the always-on PDU session; and
establish the PDU session as an always-on PDU session in response to determining that the user associated with the user device has subscribed to a service associated with the provider network that indicates that the user device is allowed to establish the always-on PDU session,
wherein the one or more instruction to establish the PDU session as an always-on PDU session comprises one or more instructions to:
transmit an establishment request message to a Policy Control Function (PCF) node to determine whether the user device is authorized to establish the always-on PDU session,
receive, from the PCF node, a determination indicating that the user device is authorized to establish the always-on PDU session, wherein the determination is based on policies associated with the provider network, and
receive an establishment response message, from the PCF node, indicating that the user device is authorized to establish the always-on PDU session.

16. The non-transitory computer-readable memory device of claim 15, wherein the one or more instruction to determine that the PDU session should be established as an always-on PDU session comprises one or more instructions to:
determine that the PDU session should be established as an always-on PDU session when the request includes a request to establish the PDU session as an always-on PDU session.

17. The non-transitory computer-readable memory device of claim 15, wherein the one or more instruction to determine whether the user device is allowed to establish the always-on PDU session comprises one or more instructions to:
send a subscription retrieval request to a Unified Data Management (UDM) device to determine whether subscription data indicates that the user device is allowed to establish the always-on PDU session.

18. The non-transitory computer-readable memory device of claim 15, wherein the one or more instruction to establish the PDU session as an always-on PDU session comprises one or more instructions to:
establish the PDU session as an always-on PDU session based on receiving the establishment response message.

19. The non-transitory computer-readable memory device of claim 15, further comprising one or more instructions to:
establish the PDU session not as an always-on PDU session in response to determining that subscription data indicates that the user device is not allowed to establish the always-on PDU session.

20. The non-transitory computer-readable memory device of claim 15, wherein the one or more instructions to determine whether the user device is allowed to establish the always-on PDU session comprises one or more instructions to:
determine that the user device is allowed to establish the always-on PDU session when subscription data includes a first indication that the always-on PDU session is allowed or when the subscription data does not include an indication regarding whether the always-on PDU session is allowed; and
determine that the user device is not allowed to establish the always-on PDU session when the subscription data includes a second indication that the always-on PDU session is not allowed.

* * * * *